US012619177B2

(12) United States Patent
Okamoto et al.

(10) Patent No.: US 12,619,177 B2
(45) Date of Patent: May 5, 2026

(54) ELECTROPHOTOGRAPHIC BELT, METHOD FOR PRODUCING ELECTROPHOTOGRAPHIC BELT, AND ELECTROPHOTOGRAPHIC IMAGE FORMING APPARATUS

(71) Applicant: CANON KABUSHIKI KAISHA, Tokyo (JP)

(72) Inventors: Kaoru Okamoto, Chiba (JP); Naoto Kameyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/015,975

(22) Filed: Jan. 10, 2025

(65) Prior Publication Data

US 2025/0244698 A1 Jul. 31, 2025

(30) Foreign Application Priority Data

Jan. 30, 2024 (JP) ................................ 2024-012038

(51) Int. Cl.
*G03G 15/16* (2006.01)

(52) U.S. Cl.
CPC .................................. *G03G 15/162* (2013.01)

(58) Field of Classification Search
CPC .................................................... G03G 15/162
See application file for complete search history.

(56) References Cited

U.S. PATENT DOCUMENTS

2005/0002704 A1* 1/2005 Nakamura ......... G03G 15/2064 399/341
2005/0025540 A1* 2/2005 Murai ................ G03G 15/2064 399/385
2007/0148418 A1* 6/2007 Tamagawa ........... G03G 7/0046 430/124.35
2009/0016773 A1* 1/2009 Hirata ................ G03G 15/0131 399/182
2009/0023090 A1* 1/2009 Fujimoto ............... D21H 19/56 427/209
2012/0237233 A1* 9/2012 Kato .................. G03G 15/0131 399/49
2013/0302050 A1* 11/2013 Shimba ............. G03G 15/5058 399/49
2016/0378036 A1* 12/2016 Onishi .............. G03G 15/5054 399/302
2019/0033764 A1* 1/2019 Kobayashi ......... G03G 15/5058
2019/0196367 A1* 6/2019 Hayami ............... G03G 15/162

FOREIGN PATENT DOCUMENTS

JP 2020-56928 A 4/2020

* cited by examiner

*Primary Examiner* — Sevan A Aydin
(74) *Attorney, Agent, or Firm* — Venable LLP

(57) ABSTRACT

An electrophotographic belt having a base layer and a surface layer on the base layer, wherein the surface layer comprises an organosilicon polymer as a binder and a silica particle as a roughening particle, a content of the silica particle in the surface layer is 2.5 to 20.0% by mass, and when a reflectance of a surface layer side of the electrophotographic belt to light with a wavelength of from 800 to 1000 nm and an incident angle of 0° is measured, a minimum value of the reflectance at the wavelength of from 800 to 1000 nm is 1.5% or more, and a difference between a maximum value and a minimum value of the reflectance at the wavelength of from 800 to 1000 nm is 0.5% or less.

8 Claims, 5 Drawing Sheets

ELECTROPHOTOGRAPHIC BELT, METHOD FOR PRODUCING ELECTROPHOTOGRAPHIC BELT, AND ELECTROPHOTOGRAPHIC IMAGE FORMING APPARATUS

BACKGROUND OF THE INVENTION

Field of the Invention

The present disclosure relates to an electrophotographic belt, a method for producing an electrophotographic belt, and an electrophotographic image forming apparatus.

Description of the Related Art

Electrophotographic image forming apparatuses (hereinafter also referred to as image forming apparatuses) are widely used as copying machines, printers, facsimile machines, etc., using electrophotographic and electrostatic recording methods.

In an image forming apparatus of an electrophotographic system, a tandem method is widely adopted in which a latent image formed on an image bearing member (photosensitive member) is developed with toner, and toner images of each color of YMCK are superimposed on an intermediate transfer belt and then transferred all at once onto paper to obtain a full-color image.

The intermediate transfer belt used in this image forming method is required to have good toner transferability from the electrostatic latent image bearing member to the intermediate transfer belt, good toner transferability from the intermediate transfer belt to a transfer material, cleaning performance for neatly removing remaining toner after transfer, and the like.

Japanese Patent Application Publication No. 2020-56928 describes an intermediate transfer belt having a base material layer and a surface layer, wherein in the surface layer, less than 2.5% by mass of a filler is added to a cured product obtained by curing an alkoxysilane.

SUMMARY OF THE INVENTION

Here, in an image forming apparatus for obtaining a full-color image, the following control may be performed to realize high color reproducibility. That is, in some cases, a toner image for correcting a color shift (hereinafter simply referred to as a "correction toner image") is formed on the intermediate transfer belt, the correction toner image is detected by an optical sensor using an image density sensor, and control for correcting color shift is performed based on the detection result. The optical sensor detects the correction toner image using the difference between the amount of reflected light from a portion where the correction toner image is not formed and the amount of reflected light from a portion where the correction toner image is formed (hereinafter simply referred to as "contrast").

However, the present inventors have found that it is difficult to maintain a constant amount of reflected light from the portion where the correction toner image is not formed with the intermediate transfer belt having the surface layer as described in Japanese Patent Application Publication No. 2020-56928. If there is non-uniformity in the reflected light from the intermediate transfer belt, the contrast of the correction toner image cannot be detected correctly, making it difficult to obtain high color reproducibility.

At least one aspect of the present disclosure is directed to providing an electrophotographic belt making it possible to detect correctly the contrast of the correction toner image. Further, at least one aspect of the present disclosure is directed to providing a method for producing the electrophotographic belt. Furthermore, at least one aspect of the present disclosure is directed to providing an electrophotographic image forming apparatus making it possible to stably form a high-quality electrophotographic image.

At least one aspect of the present disclosure provides an electrophotographic belt having a base layer and a surface layer on the base layer, wherein the surface layer comprises an organosilicon polymer as a binder and a silica particle as a roughening particle, a content of the silica particle in the surface layer is 2.5 to 20.0% by mass, and when a reflectance of a surface layer side of the electrophotographic belt to light with a wavelength of from 800 to 1000 nm and an incident angle of 0° is measured, a minimum value of the reflectance at the wavelength of from 800 to 1000 nm is 1.5% or more, and a difference between a maximum value and a minimum value of the reflectance at the wavelength of from 800 to 1000 nm is 0.5% or less.

Further, at least one aspect of the present disclosure provides a method for producing the electrophotographic belt of the present disclosure, wherein the method comprises:

a preparation step of preparing a coating liquid for forming a surface layer;

a coating step of coating the coating liquid for forming a surface layer on the base layer; and a curing step of curing the coating liquid for forming a surface layer having been coated on the base layer, the curing step comprises a step of forming an organosilicon polymer by hydrolyzing an alkoxysilane and then inducing a dehydration condensation reaction;

the preparation step comprises a step of preparing a silica particle dispersion liquid, and a step of preparing the coating liquid for forming a surface layer by using the silica particle dispersion liquid; and the step of preparing the silica particle dispersion liquid comprises a step of mixing the silica particle, a compound comprising at least one functional group selected from the group consisting of a carboxyl group and a phosphate group, and at least one amine selected from the group consisting of a secondary amine and a tertiary amine.

Furthermore, at least one aspect of the present disclosure provides electrophotographic image forming apparatus comprising the electrophotographic belt of the present disclosure as an intermediate transfer belt.

At least one aspect of the present disclosure makes it possible to obtain an electrophotographic belt capable of correctly detecting the contrast of a correction toner image. Further, at least one aspect of the present disclosure makes it possible to obtain a method for producing the electrophotographic belt. Furthermore, at least one aspect of the present disclosure makes it possible to provide an electrophotographic image forming apparatus capable of stably forming high-quality electrophotographic images. Further features of the present invention will become apparent from the following description of exemplary embodiments with reference to the attached drawings.

DESCRIPTION OF THE EMBODIMENTS

In the present disclosure the notations "from XX to YY" and "XX to YY" representing a numerical value range signify, unless otherwise specified, a numerical value range that includes the lower limit and the upper limit of the range, as endpoints. In a case where numerical value ranges are described in stages, the upper limits and the lower limits of the respective numerical value ranges can be combined arbitrarily. In the present disclosure, for instance, a wording such as "at least one selected from the group consisting of XX, YY and ZZ" encompasses XX, YY and ZZ, a combination of XX and YY, a combination of XX and ZZ, a combination of YY and ZZ, and a combination of XX, YY and ZZ.

The present inventors consider the following reason why it is difficult to maintain a constant amount of reflected light from a portion where a correction toner image is not formed in the intermediate transfer belt having the surface layer as described in Japanese Patent Application Publication No. 2020-56928.

Figure 2:
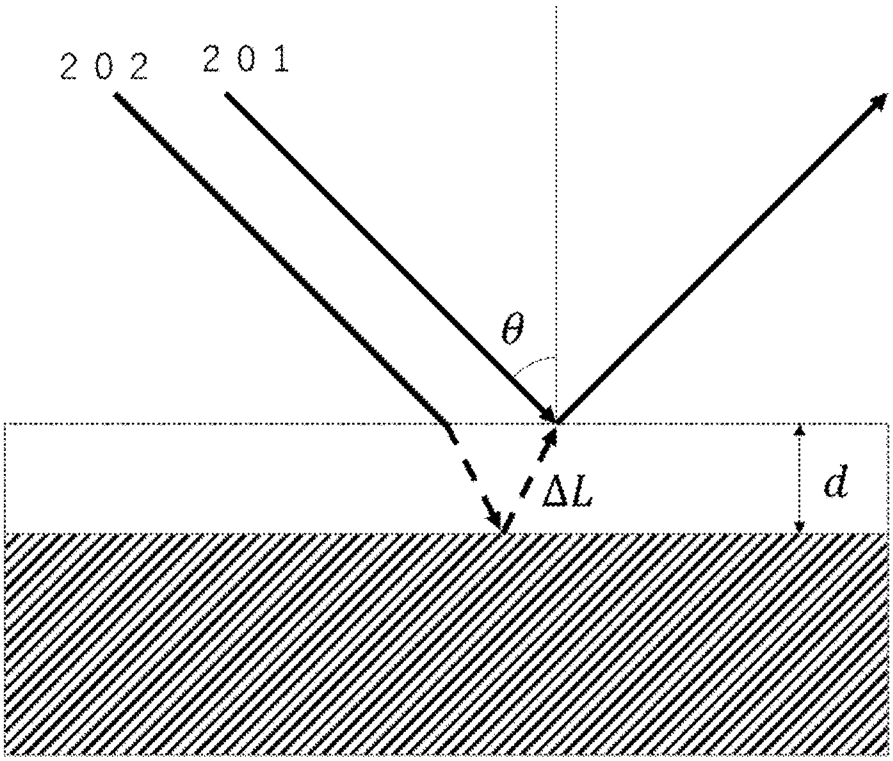
FIG. 2 is an explanatory drawing illustrating interference of regular reflected light from an electrophotographic belt having a surface layer.

That is, this is because the cured product obtained by curing an alkoxysilane has a relatively high transmittance of the wavelength used by the optical sensor, and as shown in FIG. 2, a first reflected light 201 on the intermediate transfer belt surface and a second reflected light 202 on the interface between the surface layer and the base layer are detected by the optical sensor while interfering with each other.

An optical path difference ΔL between the first reflected light 201 and the second reflected light 202, which is shown by the dotted arrows in FIG. 2, is expressed by the following formula (1) where d is the film thickness of the surface layer and n is the refractive index.

$$\Delta L = 2nd\cos\theta \quad (1)$$

When the optical path difference ΔL is an integer multiple of the wavelength λ of the incident light, the reflected lights reinforce each other, and when it is a half-integer multiple, the reflected lights weaken each other. Therefore, if there is non-uniformity in the film thickness d of the surface layer, there will also be non-uniformity in the optical path difference ΔL, and there will also be non-uniformity in the wavelength of the interfering and reinforced lights. As a result, the reflected light detected by the optical sensor will also be prone to non-uniformity. In particular, when the wavelength λ used in the optical sensor is about 900 nm and the thickness d of the surface layer is from 1 μm to 4 μm, the values of the optical path difference ΔL and the wavelength λ are approximately the same or several times larger, and strong optical interference is likely to occur.

In the production of the intermediate transfer belt described in Japanese Patent Application Publication No. 2020-56928, a dip method is used in which a coating liquid for forming a surface layer is applied to the outer surface of the base material layer. With such a method, non-uniformity in the thickness d of the surface layer is likely to occur, resulting in reflection output non-uniformity, which makes it difficult to maintain a constant amount of reflected light from the portion where the correction toner image is not formed.

However, it has been found that with the electrophotographic belt disclosed herein, the level of noise is low when the amount of toner on the electrophotographic belt used in the image forming apparatus is measured by an image density sensor, and an electrophotographic belt is obtained that makes it possible to detect correctly the contrast of the correction toner image. Since the contrast of the correction toner image can be detected correctly, color reproducibility is likely to be improved.

The inventors speculate that this is due to the following reasons.

The light source that can be used in the image density sensor uses light with a wavelength of from 800 nm to 1000 nm. In the electrophotographic belt of the present disclosure, when the reflectance of the surface layer side of the electrophotographic belt to light with the wavelength of from 800 nm to 1000 nm and an incident angle of 0° is measured, the minimum value of the reflectance at the wavelength of from 800 nm to 1000 nm is 1.5% or more, and the difference between the maximum value and the minimum value of the reflectance at the wavelength of from 800 nm to 1000 nm is 0.5% or less.

Where the minimum value of the reflectance is 1.5% or more, the amount of reflected light from the portion of the surface layer of the electrophotographic belt where the correction toner image is not formed can be easily detected by the optical sensor. In other words, the amount of reflected light can be easily detected without increasing the output of a light-emitting diode or photodiode in the image density sensor described hereinbelow. When the output of the light-emitting diode or photodiode is increased, the noise becomes relatively large, and the regular reflected light non-uniformity becomes large, making it difficult to correctly detect the contrast of the correction toner image. Furthermore, if the difference between the maximum and minimum values of the reflectance is 0.5% or less, even if non-uniformity occurs in the wavelengths of light that interfere and reinforce each other in the surface layer, non-uniformity is unlikely to occur in the reflected light.

An electrophotographic belt according to one embodiment of the present disclosure will be described in detail below. The present disclosure is not limited to the following embodiment.

The present disclosure relates to an electrophotographic belt having a base layer and a surface layer on the base layer, wherein

- the surface layer comprises an organosilicon polymer as a binder and a silica particle as a roughening particle,
- a content of the silica particle in the surface layer is 2.5 to 20.0% by mass, and
- when a reflectance of a surface layer side of the electrophotographic belt to light with a wavelength of from 800 to 1000 nm and an incident angle of 0° is measured, a minimum value of the reflectance at the wavelength of from 800 to 1000 nm is 1.5% or more, and a difference between a maximum value and a minimum value of the reflectance at the wavelength of from 800 to 1000 nm is 0.5% or less.

The electrophotographic belt has a base layer. The shape of the base layer is not particularly limited, and the belt layer may be, for example, roll-shaped or belt-shaped, an endless cylindrical type being preferred.

There is no particular limitation on the material that can constitute the base layer, but it is preferable that the base layer contain a resin. Examples of resins include polyether ether ketone, polyethylene terephthalate, polybutylene naphthalate, polyesters, polyimides, polyamides, polyamideimides, polyacetals, polyphenylene sulfides, polyvinylidene fluoride, and polycarbonates, as well as rubbers such as natural rubber, butadiene rubber, butyl rubber, acrylonitrile butadiene rubber, urethane rubber, silicone rubber, fluororubber, isoprene rubber, chloroprene rubber, styrene butadiene rubber, ethylene propylene rubber, ethylene propylene diene rubber, and polynorbornene rubber. Among these, polyimides are preferred.

The resin content in the base layer is not particularly limited, but is preferably from 70% by mass to 90% by mass relative to the base layer.

The base layer preferably contains an antistatic agent. The antistatic agent can be exemplified by carbon black. The content ratio of the antistatic agent in the base layer is not particularly limited, but is preferably from 10% by mass to 30% by mass relative to the base layer.

The base layer can be molded using known methods that use known thermoplastic resins or thermosetting resins. Specific molding methods that use thermoplastic resins include, for example, the following methods. Thus, known molding methods such as a molding method in which a resin composition is pelletized, and the pellets are continuously melted and extruded, an injection molding method, a stretch blow molding method, and an inflation molding method can be mentioned.

The electrophotographic belt has a surface layer on the base layer.

The surface layer contains an organosilicon polymer as a binder. Because an organosilicon polymer is included as a binder, the hardness of the surface layer tends to be suitable, and as a result, the cleaning performance of the toner is improved and the wear amount of the electrophotographic belt is reduced.

The nanoindentation hardness of the surface on the surface layer side is preferably from 100 MPa to 1000 MPa. By being in the above range, the hardness of the surface layer tends to be more suitable. As a result, the cleaning performance of the toner is easily improved and the wear amount of the electrophotographic belt is easily reduced. The nanoindentation hardness can be adjusted by changing the type and content of the organosilicon polymer.

There are no particular limitations on the organosilicon polymer, but for reasons of improving transferability, it is preferable that the organosilicon polymer be a polymer of an alkoxysilane, and that the alkoxysilane contain a tetraalkoxysilane. Furthermore, the alkoxysilane may contain at least one selected from the group consisting of monoalkoxysilanes, dialkoxysilanes, and trialkoxysilanes in addition to the tetraalkoxysilane. Specifically, for example, the alkoxysilane may contain at least one selected from the group consisting of tetraalkoxysilanes and trialkoxysilanes, and at least one selected from the group consisting of dialkoxysilanes and monoalkoxysilanes. The alkoxysilane may also contain a tetraalkoxysilane and a dialkoxysilane.

It is preferable that the alkoxysilane contain a tetraalkoxysilane in the range of from 80% by mass to 100% by mass relative to the total alkoxysilane. The alkoxysilane may also contain at least one selected from the group consisting of monoalkoxysilane, dialkoxysilanes, and trialkoxysilanes in the range of from 10% by mass to 20% by mass relative to the total alkoxysilane.

The alkoxysilane is not particularly limited, and examples thereof include tetraalkoxysilanes such as tetramethoxysilane, ethoxytrimethoxysilane, diethoxydimethoxysilane, triethoxymethoxysilane, tetraethoxysilane, and ethyl polysilicate; trialkoxysilanes such as trimethoxysilane, ethoxydimethoxysilane, diethoxymethoxysilane, and triethoxysilane; dialkoxysilanes such as dimethoxysilane, ethoxymethoxysilane, diethoxysilane, and methyl polysilicate; and monoalkoxysilanes such as methoxysilane and ethoxysilane. Among these, tetraethoxysilane and ethyl polysilicate are preferred.

The content of the organosilicon polymer in the surface layer is not particularly limited, but is preferably from 70% by mass to 98% by mass, and more preferably from 80% by mass to 95% by mass.

The surface layer may contain, as a binder, a cured product obtained by curing a composition curable with active energy rays such as ultraviolet light, the composition including a multifunctional acrylate or polyurethane acrylate, in addition to the organosilicon polymer.

The surface layer includes a silica particle as a roughening particle. Roughening particle is a particle that imparts non-uniformity to the outer surface of the surface layer and has the effect of controlling the toner. By including a silica particle as a roughening particle, it becomes easier to increase the surface roughness of the surface layer. As a result, the first reflected light 201 in FIG. 2 becomes smaller, and since the second reflected light 202 is small due to scattering, the interference between the first reflected light 201 and the second reflected light 202 is likely to become weak. As a result, it becomes easier to reduce the reflectance non-uniformity.

There are no particular restrictions on the shape or particle diameter of the silica particle, but it is preferable that the particle be spherical and the particle diameter be such that roughness can be formed on the surface of the surface layer. This is because, compared with irregular shape particles or fibrous materials, a spherical silica particle is more likely to achieve isotropy in terms of dispersion and orientation, and are more likely to form roughness on the surface. In addition, the silica particle is preferably a surface-treated silica particle that has been subjected to a surface treatment such as hydrophobization.

The number-average particle diameter of a secondary particle of a silica particle is not particularly limited, but is preferably from 90 nm to 500 nm, more preferably from 100 nm to 400 nm, and even more preferably from 100 nm to 250 nm. When the particle diameter is within the above range, the surface roughness of the surface layer is likely to be suitable. As a result, the regular reflection output non-uniformity is likely to be reduced, and color reproducibility is likely to be improved.

The number-average particle diameter of the secondary particle of the silica particle can be adjusted by using a below-described compound containing at least one functional group selected from the group consisting of a carboxyl group and a phosphate group, and at least one amine selected from the group consisting of secondary amines and tertiary amines, or by changing the type or content of the compound and amine. A method for measuring the number-average particle diameter of the secondary particle of the silica particle will be described below.

The content of the silica particle in the surface layer is from 2.5% by mass to 20.0% by mass. This range makes it easier to adjust the reflectance, which will be described hereinbelow. If the content of the silica particle in the surface layer exceeds 20.0% by mass, the first reflected light 201 in FIG. 2 becomes too small, making it difficult to detect with an optical sensor. The content of the silica particle in the surface layer is preferably from 2.5% by mass to 15.0% by mass, and more preferably from 5.0% by mass to 12.5% by mass. The content of the silica particle can be measured by separating the silica particle and the organosilicon polymer and measuring masses thereof.

Specifically, the measurement is performed according to the following procedure.

First, the surface layer is scraped off from the electrophotographic belt. Using a 76 razor (manufactured by Nisshin EM Co., Ltd.), the entire edge of the blade is placed at a 45-degree angle against the electrophotographic belt laid on a glass stand, and the blade is moved to the tilted side to scrape off the surface layer into powder. About 500 mg of this surface layer powder is collected. The powder is ground in an agate mortar for another 30 min or so and the mass is measured. The above procedure is repeated to collect 1 g of the surface layer powder.

A total of 1 g of the surface layer powder and the following materials are put into a 20 cc glass container and shaken for 4 h at a vibration speed of 750 cpm using a test disperser paint shaker manufactured by Toyo Seiki Co., Ltd.

| | |
|---|---|
| Glass beads (1 mm) | 3.0 g |
| Surface layer powder | 1.0 g |
| 1-Butanol | 6.0 g |

The glass beads are then separated using a 100 μm mesh filter.

Then, the separated liquid is allowed to stand, and the cured organosilicon polymer that acts as a binder in the surface layer is precipitated. Therefore, the liquid other than the precipitate can be separated to obtain a dispersion liquid of a silica particle. The dispersion liquid is then allowed to stand for 72 h in a 23° C. environment to volatilize 1-butanol which is the solvent. The mass of the resulting solid, i.e., the mass of the silica particle, is measured to determine the content of silica particle per 1 g of powder in the surface layer. From the obtained value, the content of the silica particle in the surface layer (% by mass) is calculated.

When the reflectance of a surface layer side of the electrophotographic belt to light with a wavelength of from 800 nm to 1000 nm and an incident angle of 0° is measured, the minimum value of the reflectance at the wavelength of from 800 nm to 1000 nm is 1.5% or more, and the difference between the maximum value and the minimum value of the reflectance at the wavelength of from 800 nm to 1000 nm is 0.5% or less. Since the light source of the image density sensor has a spectrum of from 800 nm to 1000 nm, the attention is focused on the reflectance of light with the wavelength of from 800 nm to 1000 nm.

The minimum value of the reflectance is preferably 2.0% or more, and more preferably 3.0% or more. The upper limit is not particularly limited, but can be exemplified by 1.5% to 6.0%, 2.0% to 6.0%, and 3.0% to 5.5%.

The reflectance can be adjusted by changing the number-average particle diameter of the secondary particle of the silica particle and the content of the silica particle. Specifically, the minimum value of the reflectance can be increased by decreasing the content of the silica particle or decreasing the number-average particle diameter of the secondary particle of the silica particle. The minimum value of the reflectance can be decreased by increasing the content of the silica particle or increasing the number-average particle diameter of the secondary particle of the silica particle.

A method for measuring the reflectance will be described hereinbelow.

In addition, where the difference between the maximum value and the minimum value of the reflectance at a wavelength of from 800 nm to 1000 nm is 0.5% or less, the non-uniformity of the wavelengths of the lights that interfere and reinforce each other in the surface layer is reduced.

The difference between the maximum value and the minimum value of the reflectance is preferably 0.4% or less. The lower limit is not particularly limited and can be exemplified by 0.0% to 0.5%, 0.0% to 0.4%, and 0.1% to 0.4%.

The difference between the maximum value and the minimum value of the reflectance can be adjusted by changing the content of the silica particle and the number-average particle diameter of the secondary particle of the silica particle.

The surface layer preferably contains a compound containing at least one functional group selected from the group consisting of a carboxyl group and a phosphate group, and at least one amine selected from the group consisting of a secondary amine and a tertiary amine. Both the compound and the amine are easily adsorbed to the surface of the silica particle, and therefore act as dispersants for the silica particle. By using two types of dispersants in this way, it becomes easier to adjust the number-average particle diameter of the secondary particle of the silica particle to the above range. In addition, since the compound is acidic, using it in combination with an amine makes it possible to obtain a suitable pH of the coating liquid for forming a surface layer.

The compound containing at least one functional group selected from the group consisting of a carboxyl group and a phosphate group is not particularly limited, and examples thereof include aliphatic saturated carboxylic acids such as formic acid, acetic acid, propionic acid, and, butyric acid; aliphatic unsaturated carboxylic acids such as acrylic acid and methacrylic acid; aromatic carboxylic acids such as benzoic acid and phthalic acid; phosphoric acid; and phosphonic acids such as monomethyl phosphate and monoethyl phosphate. Among these, acetic acid is preferred from the viewpoint of being more easily adsorbed to the surface of the silica particle and acting as a dispersant for the silica particle.

These compounds may be used alone or in combination of two or more.

The presence of the above compound or the above amine in the surface layer can be confirmed by measuring the mass spectrum of the molecules adsorbed to the surface of the silica particle by MALDI TOF MS.

When the content of the silica particle in the surface layer is taken as 100 parts by mass, the content of the above compound is not particularly limited, but may be from 0.01 parts by mass to 0.50 parts by mass, preferably from 0.05 parts by mass to 0.50 parts by mass, and more preferably from 0.10 parts by mass to 0.50 parts by mass.

A secondary amine is a compound represented by the following formula (A), and a tertiary amine is a compound represented by the following formula (B).

$$R^1R^2NH \quad (A)$$

($R^1$ and $R^2$ are each independently a freely selected organic group)

$$R^3R^4R^5N \quad (B)$$

($R^3$ to $R^5$ are each independently a freely selected organic group)

The at least one amine selected from the group consisting of a secondary amine and a tertiary amine is not particularly limited, but it is preferable that the organic group be an alkyl group. The number of carbon atoms in the alkyl group is preferably from 1 to 10, and more preferably from 3 to 8. The alkyl group may be linear or branched.

More specifically, aliphatic secondary amines such as dimethylamine, diethylamine, methylethylamine, dipropylamine, ethylpropylamine, methylpropylamine, and dioctylamine, and aliphatic tertiary amines such as trimethylamine, triethylamine, tripropylamine, and trioctylamine are preferable. Among these, it is preferable that the tertiary amine contain at least one selected from the group consisting of tripropylamine and trioctylamine.

Furthermore, aromatic secondary amines such as diphenylamine and aromatic tertiary amines such as triphenylamine may be used.

These amines may be used alone or in combination of two or more.

When the content of the silica particle in the surface layer is taken as 100 parts by mass, the content of the above amine is not particularly limited, but may be from 0.01 to 1.00 part by mass, preferably from 0.10 parts by mass to 1.00 part by mass, and more preferably from 0.25 parts by mass to 1.00 part by mass.

The 10-point average roughness Rzjis of the surface layer is not particularly limited, but is preferably from 0.10 μm to 0.50 μm, and more preferably from 0.10 μm to 0.40 μm. The surface roughness of the surface layer in the above range is suitable. As a result, the first reflected light 201 in FIG. 2 becomes smaller, and the second reflected light 202 is also smaller due to scattering, so that the interference between the first reflected light 201 and the second reflected light 202 tends to be weak. As a result, it is easy to reduce the reflectance non-uniformity. The 10-point average roughness Rzjis can be adjusted by changing the content of the silica particle and the number-average particle diameter of the secondary particle of the silica particle. Specifically, Rzjis can be increased by increasing the content of the silica particle or increasing the number-average particle diameter of the secondary particle of the silica particle. Conversely, Rzjis can be decreased by decreasing the content of the silica particle or decreasing the number-average particle diameter of the secondary particle of the silica particle. The method for measuring the 10-point average roughness Rzjis is described hereinbelow.

The thickness of the surface layer is not particularly limited, but is preferably from 1.0 μm to 3.0 μm.

A method for producing the electrophotographic belt is not particularly limited, but may be, for example, a method in which a coating liquid for each layer described below is prepared, the coating liquids are applied to a mold in the desired layer order, and the coating liquids are cured by heating and drying or electron beam irradiation. That is, the method for producing the electrophotographic belt preferably includes a preparation step of preparing a coating liquid for forming a surface layer, a coating step of coating the coating liquid for forming a surface layer on a base layer, and a curing step of curing the coating liquid for forming a surface layer that has been coated on the base layer. Furthermore, it is more preferable that a preparation step of preparing the base layer be included. The above-mentioned method for molding a base layer can be used as the preparation step of preparing the base layer.

The coating liquid used in the coating step can be applied by known methods such as dip coating, spray coating, flow coating, shower coating, roll coating, spin coating, and ring coating. Among them, the ring coating method is preferable.

The preparation step of preparing a coating liquid for forming a surface layer is not particularly limited, but preferably includes a step of preparing a silica particle dispersion liquid, and a step of preparing a coating liquid for forming a surface layer using the silica particle dispersion liquid.

The step of preparing a silica particle dispersion liquid preferably includes a step of mixing the silica particle, a compound containing at least one functional group selected from the group consisting of a carboxyl group and a phosphate group, and at least one amine selected from the group consisting of a secondary amine and a tertiary amine. The silica particle dispersion liquid is prepared by mixing the compound and the amine, which act as a dispersant for the silica particle, with the silica particle in advance, so that the silica particle is suitably dispersed. As a result, the number-average particle diameter of the secondary particle of the silica particle in the surface layer tends to be within the above range.

Furthermore, the mixing step preferably includes a step of dispersing by using a dispersing medium such as glass beads. Examples of the dispersion method include a method using a paint shaker, a bead mill, a sand mill, a ball mill, and a liquid collision type high-speed disperser.

In the mixing step, alcohol-based solvents such as methanol, ethanol, and, butanol, ketone-based solvents, ether-based solvents, ester-based solvents, aromatic hydrocarbon-based solvents, and the like, can be used as the dispersion medium.

The concentration of the silica particle in the silica particle dispersion is not particularly limited, but is preferably from 10% by mass to 30% by mass, and more preferably from 15% by mass to 25% by mass.

The content of the above compound when the content of the silica particle in the silica particle dispersion is taken as 100 parts by mass is not particularly limited, but may be from 0.01 parts by mass to 0.50 parts by mass, preferably from 0.05 parts by mass to 0.50 parts by mass, and more preferably from 0.10 parts by mass to 0.50 parts by mass.

The content of the above amine when the content of the silica particle in the silica particle dispersion is taken as 100 parts by mass is not particularly limited, but may be from 0.01 parts by mass to 1.00 part by mass, preferably from 0.10 parts by mass to 1.00 part by mass, and more preferably from 0.25 parts by mass to 1.00 part by mass.

The step of preparing a coating liquid for forming a surface layer using the silica particle dispersion liquid can be, for example, a step of mixing an alkoxysilane with the silica particle dispersion liquid. In this case, the solvent may be an alcohol-based solvent such as methanol, ethanol, and butanol, a ketone-based solvent, an ether-based solvent, an ester-based solvent, or an aromatic hydrocarbon-based solvent.

The solid content of the coating liquid for forming a surface layer is not particularly limited, but is preferably from 10% to 30%. In the above range, the thickness of the surface layer is easily adjusted to the above range.

The step of curing the coating liquid for forming a surface layer applied to the base layer preferably includes a step of forming an organosilicon polymer by hydrolyzing the alkoxysilane and then inducing a dehydration condensation reaction. By including such a curing step, it becomes easier to include an organosilicon polymer in the surface layer.

The conditions of the curing step are not particularly limited, but for example, the hydrolysis of the alkoxysilane and the dehydration condensation reaction can be achieved by baking at 80° C. to 120° C. for 30 min to 2 h. Here, it is preferable that the coating liquid for forming a surface layer include a compound containing at least one functional group selected from the group consisting of a carboxyl group and a phosphoric acid group, and at least one amine selected from the group consisting of a secondary amine and a tertiary amine, since such composition facilitates the hydrolysis of the alkoxysilane.

In the present embodiment, a tandem-type full-color copier will be described as an example of an image forming apparatus 100.

However, the present disclosure is not limited to tandem-type full-color image forming apparatuses, and may also apply to other types of full-color image forming apparatuses.

Image Forming Apparatus

Figure 1:
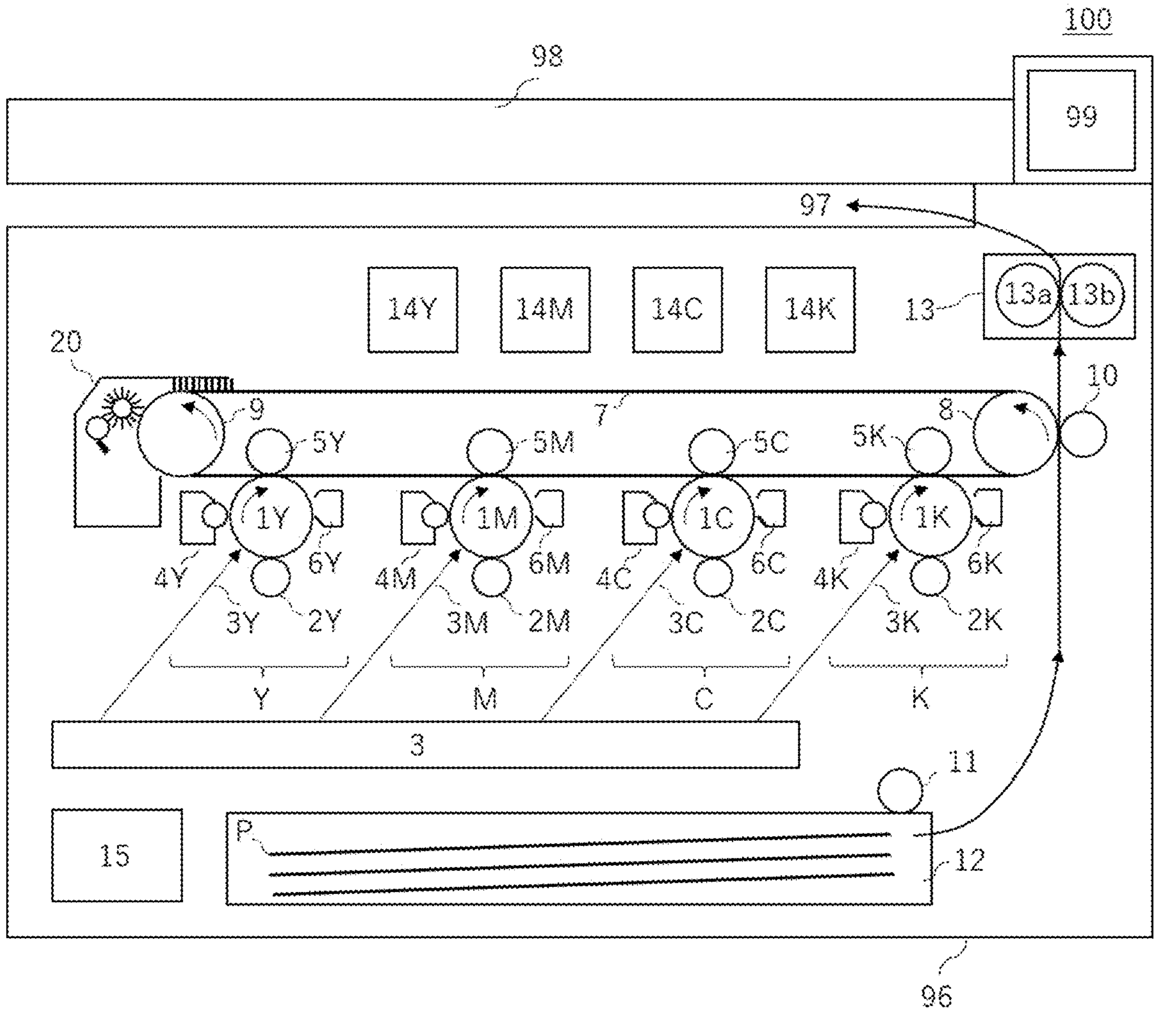
FIG. 1 is a schematic view of an image evaluation device according to at least one aspect of the present disclosure.

As shown in FIG. 1, the image forming apparatus 100 comprises an apparatus main body 96 which is an image forming unit, a sheet discharge unit 97, a control unit 15, an image reading unit 98, and an operation unit 99 which serves as a UI (user interface).

The image forming apparatus 100 can form a four-color full-color image on a recording medium in response to image signals from the image reading unit 98, a host device such as a personal computer, or an external device such as a digital camera or a smartphone. The sheet P is a recording medium on which a toner image is formed, and specific examples include plain paper, thick paper, synthetic resin sheets that are substitutes for plain paper, transparent resin sheets for overhead projectors, envelopes, postcards, coated paper, embossed paper, waterproof paper (resin sheets, resin-coated paper), and the like.

The image forming apparatus 100 of the present embodiment is compatible with full-color images, and image forming members are provided separately in the same configuration for each of the four colors, namely, a yellow image forming unit Y, a magenta image forming unit M, a cyan image forming unit C, and a black image forming unit K. For this reason, the configurations of the four colors are shown in FIG. 1 with the same reference numerals followed by color identifiers, but in the present specification, there are cases where the reference numerals alone are used without the color identifiers. The image forming apparatus 100 can also form, for example, a black monochrome image, a monochrome image of one of the above four colors, a monochrome image using some of the four colors, or a multicolor image.

Each of the image forming units Y, M, C, and K has a photosensitive drum 1 that rotates while bearing a toner image, a charging roller 2, a developing device 4, and a photosensitive member cleaning device 6. Each part of the image forming units Y, M, C, and K is unitized for each color as a cartridge and is configured to be detachable from the apparatus main body 96. When each part reaches the end of its life, the cartridge is replaced with a new one, and a new toner image of four colors can be formed on the intermediate transfer belt 7.

The photosensitive drum 1 is rotatable and bears an electrostatic latent image used for image formation. In the present embodiment, the photosensitive drum 1 is an organic photosensitive member (organic photoconductor, OPCC) with a positive charge polarity that has an outer diameter of 30 mm and is rotated by a drive motor (not shown) in the direction of the arrow at a predetermined process speed (circumferential speed). The photosensitive drum 1 has an aluminum cylinder as a base, and has three layers on the surface, namely, an undercoat layer, a photoelectric charge generation layer, and a charge transport layer, which are applied and stacked in that order.

The charging roller 2 is a conductive rubber roller that contacts the surface of the photosensitive drum 1 and rotates in response to the rotation thereof, uniformly charging the surface of the photosensitive drum 1. Depending on the voltage applied to the charging roller 2, the charging type can be classified into an AC charging type using AC voltage+DC voltage and a DC charging type using only DC voltage. In the present embodiment, the AC charging type is used, which has less charge non-uniformity.

The exposure device 3 emits laser light 3Y, 3M, 3C, 3K for each color from the exposure device 3 according to the image information of the separated colors output from the control unit 15 onto the photosensitive drums 1Y, 1M, 1C, 1K of each color, which have been uniformly charged, and forms an electrostatic latent image on the photosensitive drums 1Y, 1M, 1C, 1K of each color.

The developing device 4 contains a developer (toner) of, for example, positive charge polarity supplied from a refill toner bottle 14, and develops the electrostatic latent image formed on the photosensitive drum 1 by the laser light from the exposure device 3. In the present embodiment, a two-component development method using non-magnetic toner and magnetic carrier is adopted, and toner is supplied to the development area facing the photosensitive drum 1. A development bias (DC voltage+AC voltage) is applied to a development sleeve (not shown) carrying toner of the developing device 4, and the electrostatic latent image formed on the photosensitive drum 1 is developed with toner and made visible.

The toner image developed on the photosensitive drum 1 is primarily transferred onto the intermediate transfer belt 7 by the primary transfer roller 5. After the primary transfer, the photosensitive drum 1 is cleaned by the photosensitive member cleaning device 6, for example, by a photosensitive member cleaning blade (not shown) that is brought into contact with the photosensitive drum 1 with a predetermined pressing force, to remove the remaining untransferred toner that has not been transferred to the intermediate transfer belt 7. Thereafter, the surface is neutralized by a pre-exposure device (not shown), and the photosensitive drum 1 is prepared for the next image forming process.

The intermediate transfer belt 7 is wound around a drive roller 8 and a driven roller 9, encloses primary transfer rollers 5Y, 5M, 5C, and 5K, and is equipped with an intermediate transfer belt cleaning device 20. These are integrated to be replaceable by detaching from the apparatus main body 96 as an intermediate transfer belt unit and can be replaced with new components when the parts reach the end of service life or malfunction. The driven roller 9 is a tension roller that keeps the tension of the intermediate transfer belt 7 constant. A force is applied to the driven roller 9 by an urging force of an urging spring (not shown) that pushes the intermediate transfer belt 7 toward the front side, and this force applies a tension of about 20 N to 50 N in the transporting direction of the intermediate transfer belt 7. In the present embodiment, the intermediate transfer belt 7 is supported by two shafts, but it may be supported by three shafts, for example, and one of these shafts may be used to control the deviation of the intermediate transfer belt 7.

The primary transfer rollers 5Y, 5M, 5C, and 5K are disposed opposite the photosensitive drums 1Y, 1M, 1C, and 1K, respectively. The primary transfer rollers 5 are disposed in pressure contact with the photosensitive drum 1 with the intermediate transfer belt 7 sandwiched therebetween, and primary transfer voltages of the opposite polarity to the toner are applied, thereby primarily transferring the toner image formed on the photosensitive drum 1 onto the intermediate transfer belt 7. The primary transfer voltages applied to the primary transfer rollers 5Y, 5M, 5C, and 5K can be individually controlled by the control unit 15. In the present embodiment, the primary transfer rollers 5 have, for example, an outer diameter of from 15 mm to 20 mm, an elastic layer of ion conductive foamed rubber (NBR rubber) and a core metal, and have, for example, a resistance value of from $1\times10^5\Omega$ to $1\times10^7\Omega$ (measurement conditions: 23° C., 50% RH environment, against an aluminum drum with a diameter of 30 mm, nip width of approximately 7 mm, and 2 kV applied).

The intermediate transfer belt 7 of the present embodiment is an electrophotographic belt of the present disclosure, which is an endless belt having a two-layer structure of a base layer and a surface layer from the back side. That is, the electrophotographic image forming apparatus is equipped with the electrophotographic belt of the present disclosure as the intermediate transfer belt. Here, the base layer is made of a material in which a suitable amount of carbon black is added as an antistatic agent to a polyimide resin. The thickness of the base layer is from 50 μm to 150 μm.

In the present embodiment, an intermediate transfer belt 7 is used which has a base layer consisting of a polyimide resin with a conductive material dispersed therein and having a thickness of 60 μm and a surface layer having a thickness of 2 μm, for a total thickness of 62 μm. The intermediate transfer belt 7 of the present embodiment has a volume resistivity of from $1\times10^7$ Ω·cm to $1\times10^9$ Ω·cm (measurement conditions: 23° C., 50% RH environment, resistivity meter, 100 V applied), and a nanoindentation hardness of 600 MPa (measurement conditions: 23° C., 50% RH environment measurement).

The secondary transfer roller 10 is arranged in pressure contact with the drive roller 8 with the intermediate transfer belt 7 interposed therebetween. A DC voltage of the opposite polarity to the charge polarity of the toner is applied to the secondary transfer roller 10 as a secondary transfer voltage, and the four-color superimposed toner image primarily transferred onto the intermediate transfer belt 7 is secondarily transferred all at once onto a sheet P supplied to a nip portion (secondary transfer portion) between the drive roller 8 and the secondary transfer roller 10. The drive roller 8 is connected to a ground potential. In the present embodiment, for example, a secondary transfer voltage of from +2 kV to +5 kV is applied to the secondary transfer roller 10, causing a current of, for example, about 50 μA to flow, and the toner image on the intermediate transfer belt 7 is secondarily transferred onto the sheet P.

The primary and secondary transfer voltages or transfer currents are freely selected values determined according to the material of the photosensitive drum, the charge amount of the toner, the image formation speed, i.e., the rotation speed of the photosensitive drum 1 and the intermediate transfer belt 7, and further, in the case of secondary transfer, the material of the sheet P.

The secondary transfer roller 10 has an outer diameter of, for example, from 20 mm to 25 mm, and has an elastic layer of ion-conductive foamed rubber (NBR rubber) and a core metal. The secondary transfer roller 10 uses a roller with a resistance value of from $1\times10^5\Omega$ to $1\times10^7\Omega$ (measurement conditions: 23° C., 50% RH environment, against an aluminum drum with a diameter of 30 mm, nip width of approximately 7 mm, 2 kV applied), which is approximately the same as that of the primary transfer roller 5.

The intermediate transfer belt 7 also has the intermediate transfer belt cleaning device 20. The intermediate transfer belt cleaning device 20 removes toner remaining on the intermediate transfer belt 7 after the secondary transfer process.

The sheet P is taken out of the cassette 12 by the paper feed roller 11 and is transported, as shown by the arrow, to the secondary transfer unit of the secondary transfer roller 10 at a predetermined timing. The sheet P bearing the secondarily transferred toner image is transported to the fixing device 13.

The fixing device 13 as a fixing means includes a pressure roller 13*b* that is in pressure contact with the fixing roller 13*a*. The sheet P is sandwiched and transported between the heated fixing roller 13*a* and the pressure roller 13*b*, and the toner image that has been secondarily transferred to the sheet P is heated and pressurized to be fixed to the sheet P.

The sheet P with the toner image fixed thereto is transported to the sheet discharge unit 97, and image formation on the sheet P is completed.

Image Density Sensor

In the present embodiment, an image density sensor 300 included in the image forming apparatus is described as being arranged to face the intermediate transfer belt 7, but the arrangement of the image density sensor is not limited to the present embodiment.

Figure 3:
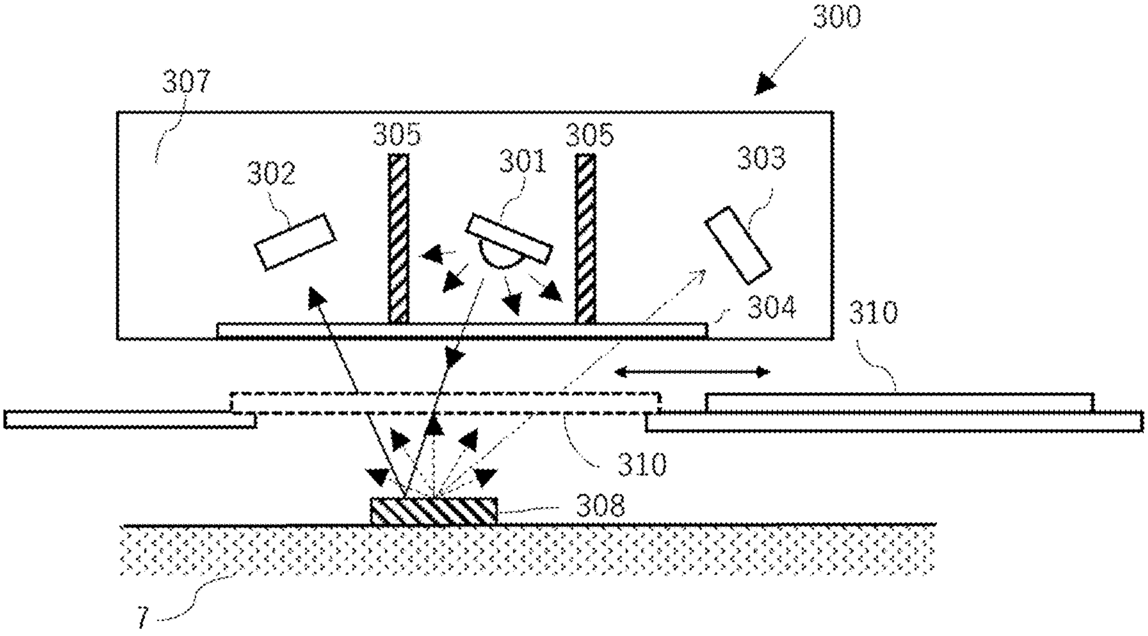
FIG. 3 is a schematic view of an image density sensor.

The image density sensor 300 is arranged opposite the intermediate transfer belt 7 as shown in FIG. 3 and measures the density of the toner image formed on the intermediate transfer belt 7. Here, a part of the structure of the image density sensor 300 will be described with reference to FIG. 3.

FIG. 3 is for explaining the configuration of the image density sensor 300 and corresponds to a cross-sectional view when viewed from the upstream side in the transport direction of the intermediate transfer belt 7.

The image density sensor 300 is an optical sensor having a light emitting diode (LED) 301, a photodiode (PD) 302, and a photodiode (PD) 303. The LED 301 is a light emitting diode arranged to irradiate the intermediate transfer belt 7 with infrared rays at an incident angle of approximately 15°. The PD 302 is a photodiode that receives the reflected light of the light radiated from the LED 301 to the intermediate transfer belt 7 and the toner image 308 at a position of a regular reflection angle. The PD 303 is a photodiode that receives the scattered light at a position of a diffuse reflection angle.

A shutter 310 is arranged between the image density sensor 300 and the intermediate transfer belt 7. When detecting the intermediate transfer belt 7 and the toner image, the shutter 310 moves to the position shown by the solid line and assumes an open state. When the image density sensor 300 is not in use, the shutter 310 moves in front of a lens 304 of the image density sensor 300 as shown by the dotted line to prevent the lens 304 from becoming dirty. The double arrow in FIG. 3 indicates the direction of the shutter movement.

A light receiving circuit having an IV conversion function that converts the current flowing according to the amount of light received by the PD 302 and PD 303 into a voltage is mounted on an electric board 307. The lens 304 provided on the electric board 307 is an optical component molded from epoxy resin to create a path for the light emitted from the LED 301 and the light received by the PD 302 and PD 303. In addition, a shielding member 305 made of black resin is provided on the electric board 307 to prevent the light emitted by the LED 301 from being directly incident on the PD 302 and PD 303.

The image density sensor 300 configured as described above is capable of measuring both regular reflected light and diffusely reflected light. The PD 302, which receives regular reflected light, and the PD 303, which receives diffusely reflected light, measure the reflected light from the intermediate transfer belt and the reflected light from the toner image 309.

Here, an example of a method for detecting patch density will be described.

For example, a case will be described in which the patch density on the intermediate transfer belt 7 is calculated using the PD 302, which receives regular reflected light.

Since the PD 302 detects both a regular reflected light component and a diffusely reflected light component, the diffusely reflected light component detected by the PD 303 is removed from the reflected light component detected by the PD 302, and a correction calculation is performed to calculate the regular reflected light component. Since the reflected light from the intermediate transfer belt 7 is large and there is almost no reflected light from the toner, the regular reflected light component detected by the PD 302 decreases as the toner image density increases. By storing the relationship between the toner image density and the regular reflected light in advance in the apparatus, the toner image density is calculated from the detected regular reflected light, and density correction is performed.

Next, the case will be explained where the patch density on the intermediate transfer belt 7 is calculated using the PD 303, which receives diffuse reflection.

The PD 303 detects only the diffusely reflected light component. Furthermore, as the toner image density increases, the amount of scattered light from the toner increases, and the diffusely reflected light component increases. By storing the relationship between the toner image density and the diffusely reflected light in advance in the apparatus, the toner image density is calculated from the detected diffusely reflected light, and density correction is performed.

The reflected light (near infrared light) from the intermediate transfer belt that is input to the image density sensor 300 is converted into an analog electrical signal of 0 V to 5 V and output. This analog electrical signal is converted into an 8-bit digital signal by an A/D conversion circuit in the control unit 15. This digital signal is then converted into density information by a density conversion circuit in the control unit 15.

Figure 4:
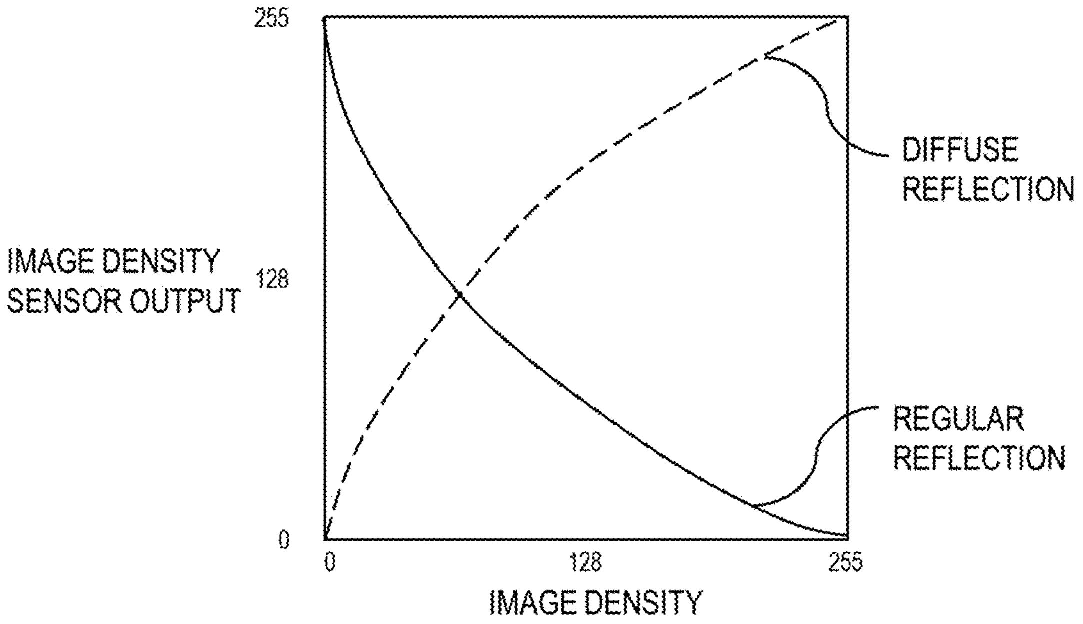
FIG. 4 is an explanatory drawing illustrating the relationship between image density and the output of the image density sensor.

FIG. 4 illustrates an example of the relationship between the output value of the image density sensor 300 and the density.

As shown in FIG. 4, when the image density of a pattern image formed on the intermediate transfer belt 7 is changed stepwise by area gradation, the output of the image density sensor 300 changes according to the density of the formed pattern image. Here, the output of the image density sensor 300 when no toner adheres to the intermediate transfer belt 7 is set to an image density level of 0, and the output changes up to 255 levels based thereon.

In the pixels formed on the intermediate transfer belt 7, as the area coverage rate of toner increases and the image density increases, the output of regular reflected light decreases and the output of diffusely reflected light increases. Based on the characteristics of the image density sensor 300, a lookup table for each color is prepared in advance to convert the output of the image density sensor 300 into a density signal for each color. The lookup tables are stored in the memory unit of the density conversion circuit. This allows the density conversion circuit to read the pattern image density for each color with high accuracy. The density conversion circuit outputs the density information to the control unit 15.

Method for Evaluating Reflectance of Electrophotographic Belt

The reflectance of the surface layer side of the electrophotographic belt is measured at an incident angle of 0° for wavelengths in the near-infrared region with an F20 film thickness measurement system (manufactured by Filmetrics) using optical interference.

Specifically, the measurement is performed according to the following procedure. That is, measurements are performed at a total of 12 points on the electrophotographic belt, 4 points in the circumferential direction and 3 points in the width direction. In the width direction, measurements are performed at 3 points, the center and positions 10 mm from both ends. In the circumferential direction, measurements are performed at 4 points every 90°. A bare silicon wafer is used as a standard reflector.

Figure 5:
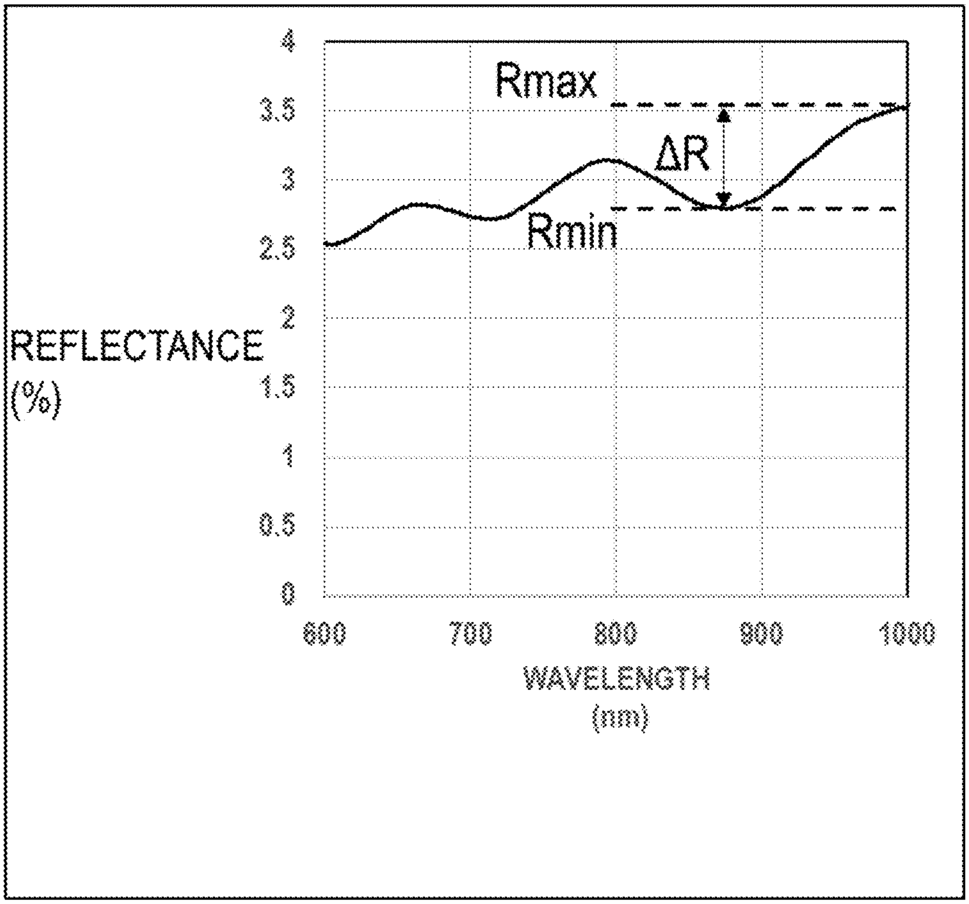
FIG. 5 is an explanatory drawing illustrating the spectral characteristics of the reflectance of an electrophotographic belt.

FIG. 5 is an explanatory drawing illustrating the spectral characteristics of the reflectance of the electrophotographic belt and is an example of measuring the reflectance of an electrophotographic belt with a surface layer thickness of 2 μm at an incidence angle of 0° from wavelengths of from 600 nm to 1000 nm. Since the light source of the image density sensor has a spectrum of from 800 nm to 1000 nm, the attention is focused on the reflectance data relating to a wavelength of from 800 nm to 1000 nm. In this wavelength range of from 800 nm to 1000 nm, the maximum reflectance value is denoted by Rmax (%), the minimum value is denoted by Rmin (%), and the difference between the maximum value and the minimum value of the reflectance is ΔR (%)=Rmax−Rmin.

ΔR (%) is calculated for each of the 12 measurement points, and the arithmetic average value is taken as the difference between the maximum value and the minimum value of the reflectance of the electrophotographic belt.

Method for Evaluating Surface Roughness of Electrophotographic Belt

The 10-point average roughness Rzjis of the electrophotographic belt is obtained using a surface roughness measuring instrument (manufactured by Kosaka Laboratory Ltd., product name: SE800) that can perform measurements in accordance with JIS B0601 (2001). The measurement direction at this time is the width direction of the intermediate transfer belt, and the cutoff value λ is 0.8 mm.

Specifically, the measurements are performed using the following procedure. That is, measurements are performed using the surface roughness measuring instrument at a total of 12 points on the electrophotographic belt, 4 points in the circumferential direction and 3 points in the width direction. In the width direction, measurements are performed at 3 points, the center and positions 10 mm from both ends. In the circumferential direction, measurements are performed at 4 points every 90°. The arithmetic mean value of the obtained 10-point average roughness is taken as the 10-point average roughness Rzjis of the electrophotographic belt.

Number-Average Particle Diameter of Secondary Particle of Silica Particle

The number-average particle diameter of the secondary particle of the silica particle in the surface layer is measured by the following procedure.

(i) A total of 10 measurement samples are sampled from freely selected locations on the belt.

(ii) A part of the cross section of each of the measurement samples is cut out with a microtome, and the resulting cross section is coated with PtPd by sputtering, grounded, and observed with a scanning electron microscope (SEM) at an acceleration voltage of 5 kV and 50,000 times magnification to obtain a photograph. From the obtained photograph, the diameter of the silica particle in the belt thickness direction and in the direction perpendicular to the belt thickness direction is measured, and the arithmetic mean value of the measurement results is taken as the particle diameter of the silica particle.

(iii) Measurements are performed for 30 silica particles in each of the 10 measurement samples, and the arithmetic mean value of the measurement result is taken as the number-average particle diameter of the secondary particle of the silica particle in the surface layer.

Method for Evaluating Regular Reflection Output Non-Uniformity

The electrophotographic belt to be evaluated is mounted on imagePRESS C270 manufactured by Canon Inc. The regular reflection output per revolution of the electrophotographic belt is measured in 1 mm increments, and the arithmetic mean value Vave, maximum value Vmax, and minimum value Vmin thereof are obtained. The regular reflection output non-uniformity (ΔV) is evaluated using the following formula (2). The image density sensor is placed at a position ±130 mm from the center of the electrophotographic belt in the width direction. Since the regular reflection output changes depending on the output of the LED 301, the amount of light is adjusted so that the regular reflection output is 2 V.

$$\Delta V = (Vmax - Vmin)/Vave \qquad (2)$$

Method for Evaluating Changing in Tinges

The electrophotographic belt to be evaluated is mounted on imagePRESS C270 manufactured by Canon Inc. The intermediate gradation (127/255 gradation) and the maximum gradation (255/255 gradation) of each monochrome YMCK are continuously output onto OK Topcoat A4 127.9 gsm (manufactured by Oji Paper Co., Ltd.), and 50 samples are extracted every 105 sheets. The color difference ΔE76 (CIE 1976) is then measured in comparison with the first sheet, the maximum color difference of each color is found for the 50 samples, and the average is taken as ΔEmax, ave. The evaluation ranks for changing in tinges are determined according to the values of ΔEmax, ave as follows:

A: ΔEmax, ave value is 0.3 or less

B: ΔEmax, ave value is greater than 0.3 and 0.8 or less

C: ΔEmax, ave value is greater than 0.8

Example 1

Production of Electrophotographic Belt

Production of Electrophotographic Belt 1

An endless belt-shaped electrophotographic belt 1 having a base layer and a surface layer on the base layer, a circumference of 1048 mm, a width of 360 mm, and a thickness of 60 μm was produced in the following manner.

(1) Preparation of an Endless Belt-Shaped Base Layer

Dried oxidized carbon black "SPECIAL BLACK 4" (manufactured by Degussa, pH 3.0, volatile content: 14.0%) was added to a n-methyl-2-pyrrolidone (NMP) solution "U-Varnish-S (solid 18% by mass)" (manufactured by Ube Industries, Ltd.) of polyamic acid consisting of 3,3',4,4'-biphenyltetracarboxylic dianhydride (BPDA) and p-phenylenediamine (PDA) in an amount of 23 parts by mass per 100 parts by mass of polyimide resin solid. Mixing was then performed by using a collision type disperser "Geanus PY" (manufactured by Seenus, Ltd.), dividing in two with a minimum area of 1.4 $mm^2$ at a pressure of 200 MPa, and passing five times through a path that divides the mixture into two again to obtain a polyamic acid solution containing carbon black.

The polyamic acid solution containing carbon black was applied to the inner surface of a cylindrical mold to a thickness of 0.5 mm using a dispenser and was rotated at 1500 rpm for 15 min and spread to form a layer with a uniform thickness. After that, while rotating at 250 rpm, 60° C. hot air was supplied from the outside of the mold for 30 min, followed by heating at 150° C. for 60 min. The temperature was then raised to 360° C. at a temperature rise rate of 2° C./min, followed by heating at 360° C. for 30 min to remove the solvent, remove the dehydrated ring-closed water, and complete the imide conversion reaction. The temperature was then returned to room temperature, and the layer was peeled off from the cylindrical mold to produce an endless belt-shaped base layer made of polyimide with a thickness of 60 μm.

(2) Formation of Surface Layer

First, a dispersion liquid of a silica particle to be added to the coating liquid for forming a surface layer was prepared. The dispersion liquid of the silica particle was prepared by putting the following materials into a 300 cc glass container and shaking for 4 h at a shaking speed of 750 cpm using a test disperser paint shaker manufactured by a Toyo Seiki Co., Ltd.

| Silica Particle Dispersion Liquid | |
|---|---|
| Glass beads (1 mm) | 30.0 parts by mass |
| Silica particle (HMDS treated, number-average particle diameter of primary particle 30 nm) | 20.0 parts by mass |
| Acetic acid | 0.05 parts by mass |
| Trioctylamine | 0.10 parts by mass |
| 1-Butanol | 80.0 parts by mass |

Then, the glass beads were separated using a 100 μm mesh filter to obtain a silica particle dispersion liquid with a solid content of approximately 20% by mass.

Next, the coating liquid for forming a surface layer was prepared using the materials shown below.

| Coating Liquid for Forming Surface Layer | |
|---|---|
| Tetraethoxysilane | 54.0 parts by mass |
| Ethyl polysilicate (average pentamer) | 36.0 parts by mass |
| 20% by mass Silica particle dispersion liquid | 10.0 parts by mass |
| 1-Butanol | 90.0 parts by mass |

In a test conducted in advance in which a coating liquid consisting only of tetraethoxysilane, ethyl polysilicate, and 1-butanol was baked in an air atmosphere at 100° C. for 60 min, the total solid content of tetraethoxysilane and ethyl polysilicate was 20% by mass. Therefore, in the coating liquid, 10 parts by mass of silica particle dispersion having a solid content of 20% by mass include 2 parts by mass of the silica particle with respect to 18 parts by mass of an organosilicon polymer composed of tetraethoxysilane and ethyl polysilicate. Thus, a surface layer containing 10% by mass of the silica particle is obtained from the coating liquid.

Then, the base layer obtained above was placed on the outer periphery of a cylindrical mold. The coating liquid for forming a surface layer was applied to the outer surface of the base layer by discharging the coating liquid for forming a surface layer from a ring nozzle, which is capable of applying the coating cylindrically, and moving the nozzle on the outer periphery (ring coating method). After that, the electrophotographic belt 1 was obtained by baking the coating liquid for 60 min at 100° C. in an air atmosphere.

The thickness of the surface layer can be adjusted by the solid content of the coating liquid, but it can also be controlled by the amount of the coating liquid discharged from the ring nozzle and the moving speed of the ring nozzle. In the present example, the amount of the coating liquid discharged was adjusted so that the surface layer had a thickness of 2.0 μm after baking the coating liquid for 60 min at 100° C. in an air atmosphere.

Further, the reflectance and surface roughness of the electrophotographic belt 1 were measured, and the number-average particle diameter of the secondary particle of the silica particle, the regular reflection output non-uniformity, and changing in tinges were evaluated.

Examples 2 and 3

Electrophotographic belts 2 and 3 were produced and evaluated in the same manner as in Example 1, except that the composition of the coating liquid for forming a surface layer was changed as shown in Table 2.

Examples 4 to 6

Electrophotographic belts 4 to 6 were produced and evaluated in the same manner as in Example 1, except that the dispersing agent added to the silica particle dispersion liquid was changed from trioctylamine to tripropylamine and the composition of the coating liquid for forming a surface layer was changed as shown in Table 3.

Examples 7 to 9

Electrophotographic belts 7 to 9 were produced and evaluated in the same manner as in Example 1, except that the amount of trioctylamine added to the silica particle dispersion liquid was changed as shown in Table 1 and the composition of the coating liquid for forming a surface layer was changed as shown in Table 3.

TABLE 1

| | Silica particle dispersion liquid materials | | | |
|---|---|---|---|---|
| | Silica particle (particle diameter/parts by mass) | Dispersing agent 1 (name of material/parts by mass) | Dispersing agent 2 (name of material/parts by mass) | 1-Butanol (parts by mass) |
| Example 1 | 30/20.0 | Acetic acid/0.05 | Trioctylamine/0.10 | 80 |
| Example 2 | 30/20.0 | Acetic acid/0.05 | Trioctylamine/0.10 | 80 |
| Example 3 | 30/20.0 | Acetic acid/0.05 | Trioctylamine/0.10 | 80 |
| Example 4 | 30/20.0 | Acetic acid/0.05 | Tripropylamine/0.10 | 80 |
| Example 5 | 30/20.0 | Acetic acid/0.05 | Tripropylamine/0.10 | 80 |
| Example 6 | 30/20.0 | Acetic acid/0.05 | Tripropylamine/0.10 | 80 |
| Example 7 | 30/20.0 | Acetic acid/0.01 | Trioctylamine/0.02 | 80 |
| Example 8 | 30/20.0 | Acetic acid/0.01 | Trioctylamine/0.02 | 80 |
| Example 9 | 30/20.0 | Acetic acid/0.01 | Trioctylamine/0.02 | 80 |
| Comparative Example 1 | 30/20.0 | Acetic acid/0.05 | Trioctylamine/0.10 | 80 |
| Comparative Example 2 | 30/20.0 | Acetic acid/0.05 | Trioctylamine/0.10 | 80 |
| Comparative Example 3 | 30/20.0 | Acetic acid/0.05 | Tripropylamine/0.10 | 80 |
| Comparative Example 4 | 30/20.0 | Acetic acid/0.05 | Tripropylamine/0.10 | 80 |
| Comparative Example 5 | 30/20.0 | Acetic acid/0.01 | None | 80 |

In the table, particle diameter indicates the number-average particle diameter (nm) of the primary particle.

TABLE 2

| | Materials of coating liquid for forming surface layer | | | | |
|---|---|---|---|---|---|
| | Tetraethoxysilane (parts by mass) | Ethyl polysilicate (parts by mass) | Silica particle dispersion liquid (parts by mass) | 1-Butanol (parts by mass) | Content of silica particle (% by mass) |
| Example 1 | 54.0 | 36.0 | 10.0 | 90.0 | 10.0 |
| Example 2 | 58.5 | 39.0 | 2.5 | 97.5 | 2.5 |
| Example 3 | 48.0 | 32.0 | 20.0 | 80.0 | 20.0 |
| Example 4 | 54.0 | 36.0 | 10.0 | 90.0 | 10.0 |
| Example 5 | 58.5 | 39.0 | 2.5 | 97.5 | 2.5 |
| Example 6 | 48.0 | 32.0 | 20.0 | 80.0 | 20.0 |
| Example 7 | 54.0 | 36.0 | 10.0 | 90.0 | 10.0 |
| Example 8 | 58.5 | 39.0 | 2.5 | 97.5 | 2.5 |

TABLE 2-continued

| | Materials of coating liquid for forming surface layer | | | | |
|---|---|---|---|---|---|
| | Tetraethoxysilane (parts by mass) | Ethyl polysilicate (parts by mass) | Silica particle dispersion liquid (parts by mass) | 1-Butanol (parts by mass) | Content of silica particle (% by mass) |
| Example 9 | 48.0 | 32.0 | 20.0 | 80.0 | 20.0 |
| Comparative Example 1 | 58.8 | 39.2 | 2.0 | 98.0 | 2.0 |
| Comparative Example 2 | 42.0 | 28.0 | 30.0 | 70.0 | 30.0 |
| Comparative Example 3 | 58.8 | 39.2 | 2.0 | 98.0 | 2.0 |
| Comparative Example 4 | 42.0 | 28.0 | 30.0 | 70.0 | 30.0 |
| Comparative Example 5 | 58.5 | 39.0 | 2.5 | 97.5 | 2.5 |

In the table, silica particle dispersion liquid indicates a 20% by mass silica particle dispersion liquid.

Comparative Examples 1 and 2

Electrophotographic belts 10 and 11 were produced and evaluated in the same manner as in Example 1, except that the composition of the coating liquid for forming a surface layer was changed as shown in Table 2.

Comparative Examples 3 and 4

Electrophotographic belts 12 and 13 were produced and evaluated in the same manner as in Example 4, except that the composition of the coating liquid for forming a surface layer was changed as shown in Table 2.

Comparative Example 5

Electrophotographic belt 14 was produced and evaluated in the same manner as in Example 2, except that trioctylamine was not added to the silica particle dispersion liquid as shown in Table 2.

Table 3 shows the results of the evaluation of electrophotographic belts 1 to 14 and image evaluation.

Figure 6:
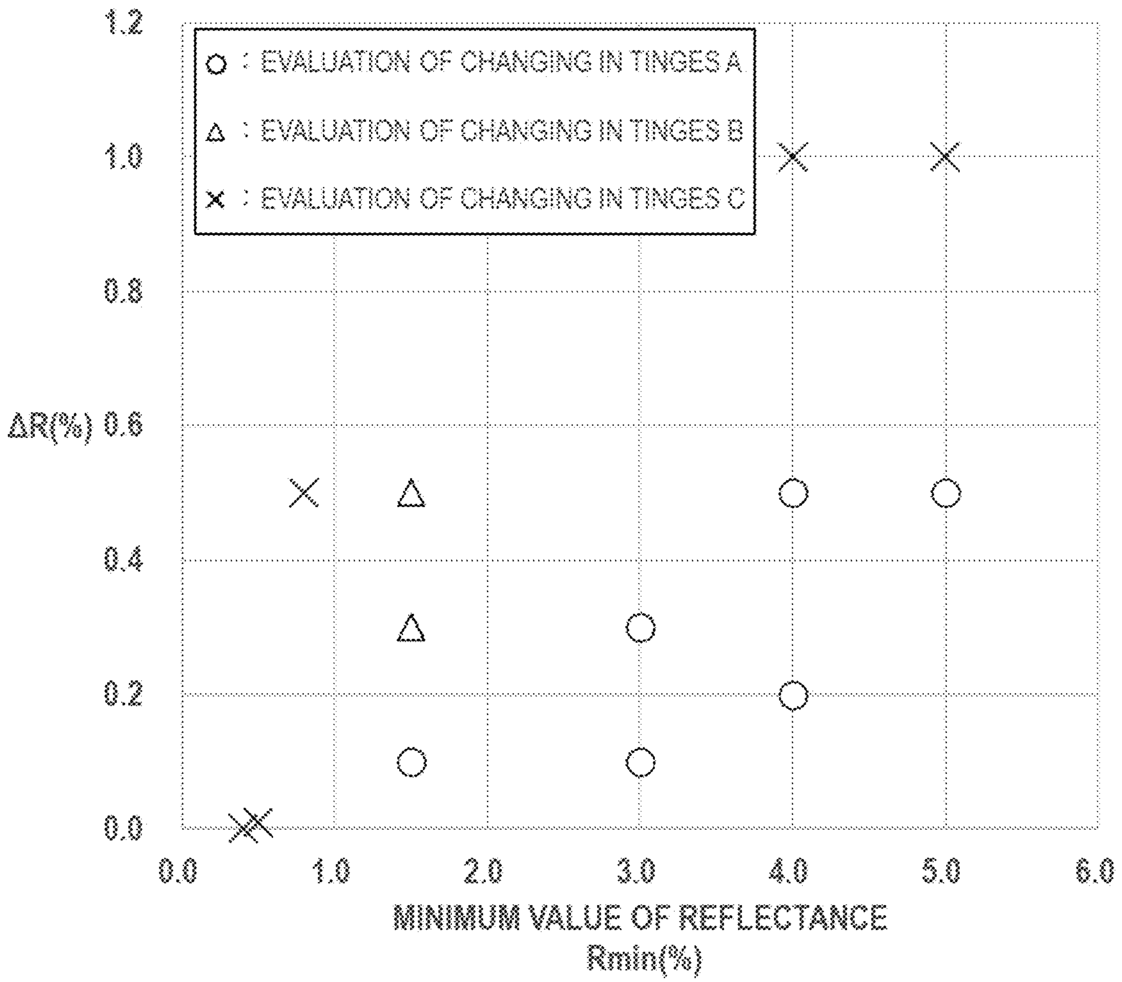
FIG. 6 is an explanatory drawing illustrating the reflectance characteristics and evaluation results of changing in tinges of Examples and Comparative Examples.

Furthermore, FIG. 6 is an explanatory diagram illustrating the reflectance characteristics and evaluation results of changing in tinges of Examples and Comparative Examples. Here, the evaluation results of the electrophotographic belts, especially the evaluation results of reflectance characteristics and changing in tinges are summarized.

TABLE 3

| | Evaluation of intermediate transfer belt | | | | | | |
|---|---|---|---|---|---|---|---|
| | Average particle diameter of silica secondary particle (nm) | Surface roughness Rzjis (μm) | Maximum value of reflectance Rmax (%) | Minimum value of reflectance Rmin (%) | ΔR (%) | Regular reflection output non-uniformity ΔV(%) | Image evaluation Evaluating of changing in tinges |
| Intermediate transfer belt 1 | 100 | 0.20 | 4.2 | 4.0 | 0.2 | 5 | A |
| Intermediate transfer belt 2 | 100 | 0.10 | 5.5 | 5.0 | 0.5 | 5 | A |
| Intermediate transfer belt 3 | 105 | 0.40 | 3.1 | 3.0 | 0.1 | 7 | A |
| Intermediate transfer belt 4 | 190 | 0.25 | 3.3 | 3.0 | 0.3 | 8 | A |
| Intermediate transfer belt 5 | 200 | 0.15 | 4.5 | 4.0 | 0.5 | 8 | A |
| Intermediate transfer belt 6 | 210 | 0.40 | 1.6 | 1.5 | 0.1 | 10 | A |
| Intermediate transfer belt 7 | 400 | 0.40 | 1.8 | 1.5 | 0.3 | 15 | B |
| Intermediate transfer belt 8 | 400 | 0.40 | 2.0 | 1.5 | 0.5 | 16 | B |
| Intermediate transfer belt 9 | 400 | 0.40 | 1.8 | 1.5 | 0.3 | 18 | B |
| Intermediate transfer belt 10 | 100 | 0.05 | 6.0 | 5.0 | 1.0 | 40 | C |
| Intermediate transfer belt 11 | 105 | 0.70 | 0.5 | 0.5 | 0 | 35 | C |
| Intermediate transfer belt 12 | 200 | 0.08 | 5.0 | 4.0 | 1.0 | 46 | C |
| Intermediate transfer belt 13 | 190 | 0.90 | 1.3 | 0.8 | 0.5 | 60 | C |
| Intermediate transfer belt 14 | 600 | 0.60 | 0.4 | 0.4 | 0 | 45 | C |

In the table, the surface roughness Rzjis indicates the 10-point average roughness Rzjis of the surface layer.

As shown in FIG. 6, when the minimum value of the reflectance is 1.5% or more and the difference ΔR between the maximum value and the minimum value of the reflectance is 0.5% or less, the changing in tinges is small. This is thought to be because when the minimum value of the reflectance is small, it is necessary to increase the output of the light-emitting diode and photodiode, and the noise thereof becomes relatively large, which increases the regular reflection output non-uniformity.

In addition, when ΔR exceeds 0.5%, if there is non-uniformity in the wavelength of the lights that interfere and reinforce each other, optical interference occurs on the surface of the intermediate transfer belt, and as a result, the regular reflection light non-uniformity that enters the photodiode increases. As a result, it is thought that accurate contrast cannot be obtained and the changing in tinges becomes large.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-012038, filed Jan. 30, 2024 which is hereby incorporated by reference herein in its entirety.

What is claimed is:

1. An electrophotographic belt having a base layer and a surface layer on the base layer, wherein the surface layer comprises an organosilicon polymer as a binder and a silica particle as a roughening particle, a content of the silica particle in the surface layer is 2.5 to 20.0% by mass, and when a reflectance of a surface layer side of the electrophotographic belt to light with a wavelength of from 800 to 1000 nm and an incident angle of 0° is measured, a minimum value of the reflectance at the wavelength of from 800 to 1000 nm is 1.5% or more, and a difference between a maximum value and the minimum value of the reflectance at the wavelength of from 800 to 1000 nm is 0.5% or less.

2. The electrophotographic belt according to claim 1, wherein the surface layer further comprises a compound comprising at least one functional group selected from the group consisting of a carboxyl group and a phosphate group, and at least one amine selected from the group consisting of a secondary amine and a tertiary amine.

3. The electrophotographic belt according to claim 2, wherein the tertiary amine comprises at least one selected from the group consisting of tripropylamine and trioctylamine.

4. The electrophotographic belt according to claim 2, wherein the compound comprises acetic acid.

5. The electrophotographic belt according to claim 1, wherein the surface layer has a 10-point average roughness Rzjis of from 0.10 to 0.50 μm.

6. The electrophotographic belt according to claim 1, wherein a number-average particle diameter of a secondary particle of the silica particle is 100 to 400 nm.

7. A method for producing the electrophotographic belt according to claim 1, the method comprising:

a preparation step of preparing a coating liquid for forming a surface layer;

a coating step of coating the coating liquid on the base layer; and a curing step of curing the coating liquid coated on the base layer, wherein:

the curing step comprises a step of forming an organosilicon polymer by hydrolyzing an alkoxysilane and then inducing a dehydration condensation reaction;

the preparation step comprises a step of preparing a silica particle dispersion liquid, and a step of preparing the coating liquid by using the silica particle dispersion liquid; and the step of preparing the silica particle dispersion liquid comprises a step of mixing the silica particle, a compound comprising at least one functional group selected from the group consisting of a carboxyl group and a phosphate group, and at least one amine selected from the group consisting of a secondary amine and a tertiary amine.

8. An electrophotographic image forming apparatus comprising an intermediate transfer belt, wherein the intermediate transfer belt is an electrophotographic belt having a base layer and a surface layer on the base layer, the surface layer comprises an organosilicon polymer as a binder and a silica particle as a roughening particle, a content of the silica particle in the surface layer is 2.5 to 20.0% by mass, and when a reflectance of a surface layer side of the electrophotographic belt to light with a wavelength of from 800 to 1000 nm and an incident angle of 0° is measured, a minimum value of the reflectance at the wavelength of from 800 to 1000 nm is 1.5% or more, and a difference between a maximum value and the minimum value of the reflectance at the wavelength of from 800 to 1000 nm is 0.5% or less.

* * * * *